United States Patent
Perigault

(10) Patent No.: US 9,973,456 B2
(45) Date of Patent: May 15, 2018

(54) MESSAGING AS A GRAPHICAL COMIC STRIP

(71) Applicant: Strip Messenger, Paris (FR)

(72) Inventor: Albin Perigault, Paris (FR)

(73) Assignee: Strip Messenger, Paris (FR)

( * ) Notice: Subject to any disclaimer, the term of this patent is extended or adjusted under 35 U.S.C. 154(b) by 0 days. days.

(21) Appl. No.: 15/661,982

(22) Filed: Jul. 27, 2017

(65) Prior Publication Data

US 2018/0026922 A1 Jan. 25, 2018

Related U.S. Application Data

(63) Continuation of application No. 15/655,705, filed on Jul. 20, 2017.

(60) Provisional application No. 62/365,854, filed on Jul. 22, 2016.

(51) Int. Cl.
| | | |
|---|---|---|
| G06F 3/00 | (2006.01) | |
| H04L 12/58 | (2006.01) | |
| G06T 13/80 | (2011.01) | |
| H04L 12/18 | (2006.01) | |

(52) U.S. Cl.
CPC ............ H04L 51/043 (2013.01); G06T 13/80 (2013.01); H04L 12/1813 (2013.01); H04L 51/10 (2013.01); H04L 51/16 (2013.01); H04L 51/22 (2013.01)

(58) Field of Classification Search
CPC .............................. G06F 17/217; G06T 11/60
USPC ........ 715/234, 753, 243, 252, 253, 758, 759
See application file for complete search history.

(56) References Cited

U.S. PATENT DOCUMENTS

| | | | | |
|---|---|---|---|---|
| 5,911,146 A | * | 6/1999 | Johari | G06F 17/217 715/234 |
| 6,069,622 A | * | 5/2000 | Kurlander | G06T 11/60 715/753 |
| 6,990,452 B1 | | 1/2006 | Ostermann et al. | |
| 7,669,134 B1 | | 2/2010 | Christie et al. | |
| 9,684,430 B1 | | 6/2017 | Perigault | |
| 2001/0049596 A1 | | 12/2001 | Lavine et al. | |
| 2002/0194006 A1 | | 12/2002 | Challapali | |
| 2005/0143108 A1 | | 6/2005 | Seo et al. | |
| 2005/0156873 A1 | | 7/2005 | Walter et al. | |
| 2005/0261031 A1 | | 11/2005 | Seo et al. | |
| 2007/0266090 A1 | | 11/2007 | Len | |
| 2008/0039124 A1 | | 2/2008 | Linder et al. | |
| 2008/0216022 A1 | | 9/2008 | Lorch et al. | |

(Continued)

OTHER PUBLICATIONS

Full Emoji Data, v3.0, "Grinning face with smiling eyes" emoji, http://unicode.org/emoji/charts/full-emoji-list.html; retrieved Aug. 30, 2016, pp. 1-74.

(Continued)

Primary Examiner — Andrey Belousov
(74) Attorney, Agent, or Firm — Carr & Ferrell LLP

(57) ABSTRACT

Systems and methods for messaging as a graphical comic strip are disclosed herein. An example method includes receiving a text message from a user, computing a conversation topology for the comic panel based on the message, the number of previous messages, and the number of user avatars, selecting a panel template based on a zoom level, the conversation topology, and a length of each message, and filling the panel template with user avatars and each message in an associated speech bubble to create the comic panel.

20 Claims, 6 Drawing Sheets

(56) References Cited

U.S. PATENT DOCUMENTS

| | | |
|---|---|---|
| 2010/0125785 A1 | 5/2010 | Moore et al. |
| 2011/0009109 A1 | 1/2011 | Hyon |
| 2011/0055336 A1 | 3/2011 | Park et al. |
| 2011/0294525 A1 | 12/2011 | Jonsson |
| 2012/0059787 A1 | 3/2012 | Brown et al. |
| 2012/0069028 A1 | 3/2012 | Bouguerra |
| 2012/0130717 A1 | 5/2012 | Xu et al. |
| 2013/0147933 A1 | 6/2013 | Kulas |
| 2014/0067397 A1 | 3/2014 | Radebaugh |
| 2014/0082520 A1 | 3/2014 | Mamoun |
| 2014/0161356 A1 | 6/2014 | Tesch et al. |
| 2015/0026620 A1 | 1/2015 | Kwon et al. |
| 2015/0133176 A1 | 5/2015 | Blount et al. |
| 2015/0220774 A1 | 8/2015 | Ebersman et al. |
| 2016/0004413 A1 | 1/2016 | Leydon et al. |
| 2016/0035123 A1 | 2/2016 | Bonansea |

OTHER PUBLICATIONS

Phone J.D., "Review: Stick Texting-add funny animations to your text messages," Aug. 16, 2012 [online] Retreived from the Internet: <URL:http://www.iphonejd.com>, pp. 1-2.

* cited by examiner

MESSAGING AS A GRAPHICAL COMIC STRIP

CROSS REFERENCE TO RELATED APPLICATIONS

This application is a continuation application that claims the benefit and priority of U.S. Nonprovisional patent application Ser. No. 15/655,705, filed on Jul. 20, 2017, which in turn claims the benefit and priority of U.S. Provisional Application No. 62/365,854, filed on Jul. 22, 2016. This application is related to U.S. Nonprovisional patent application Ser. No. 15/221,519, filed on Jul. 27, 2016, and issued on Jun. 20, 2017 as U.S. Pat. No. 9,684,430. The above-referenced applications are hereby incorporated by reference herein in their entirety, including all references and appendices cited therein.

FIELD OF THE TECHNOLOGY

The present technology relates generally to communication systems, and, more particularly, to systems and methods for generating graphical representations of text messaging.

BACKGROUND OF THE DISCLOSURE

Users currently rely on conventional messaging applications on electronic computing devices for general conversation. Such messaging applications are limited to text, pictures, emojis, stickers and videos with limited options for creative expression, and lack graphical and visual interpretation of the ongoing textual conversation. Unfortunately, this deficiency has never been previously addressed.

SUMMARY OF THE PRESENT TECHNOLOGY

The present disclosure is related in general to a method for messaging as a graphical comic strip that includes providing a comic panel having a number of previous messages and a number of user avatars; receiving a message from a first user; setting a zoom level for the comic panel; automatically computing a conversation topology for the comic panel based on the message, the number of previous messages, and the number of user avatars; automatically selecting a panel template based on the zoom level, the conversation topology, and a length of each message; and filling the template with user avatars and each message in an associated speech bubble.

According to some embodiments, the present disclosure is directed to a method, comprising: (a) providing a comic panel having a number of previous messages and a number of user avatars; (b) receiving a message from a user; (c) computing a conversation topology for the comic panel based on the message, the number of previous messages, and the number of user avatars; (d) selecting a panel template based on a zoom level, the conversation topology, and a length of each message; and (e) filling the panel template with user avatars and each message in an associated speech bubble to create the comic panel.

According to some embodiments, the present disclosure is directed to a method, comprising: (a) receiving a message from a user; (b) determining that a new comic panel is required; (c) generating avatars for participants identified in the message; (d) providing a comic panel having the avatars; (e) computing a conversation topology for the comic panel based on the message and the number of user avatars; and (d) filling a panel template with user avatars and each message in an associated speech bubble.

According to some embodiments, the present disclosure is directed to a system, comprising (a) a processor; and (b) memory for storing executable instructions, the processor executing the instructions to: (i) provide a comic panel having a number of previous messages and a number of user avatars; (ii) receive a message from a user; (iii) compute a conversation topology for the comic panel based on the message, the number of previous messages, and the number of user avatars; (iv) select a panel template based on a zoom level, the conversation topology, and a length of each message; and (v) fill the panel template with user avatars and each message in an associated speech bubble to create the comic panel.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a method for messaging as a graphical comic strip, including: providing a comic panel having a number of previous messages and a number of user avatars. The method also includes receiving a message from a user. The method also includes computing a conversation topology for the comic panel based on the message, the number of previous messages, and the number of user avatars. The method also includes selecting a panel template based on a zoom level, the conversation topology, and a length of each message. The method also includes filling the panel template with user avatars and each message in an associated speech bubble to create the comic panel. Other embodiments of this aspect include corresponding computer systems, apparatus, and computer programs recorded on one or more computer storage devices, each configured to perform the actions of the methods.

BRIEF DESCRIPTION OF THE DRAWINGS

The accompanying drawings, where like reference numerals refer to identical or functionally similar elements throughout the separate views, together with the detailed description below, are incorporated in and form part of the specification, and serve to further illustrate embodiments of concepts that include the claimed disclosure, and explain various principles and advantages of those embodiments.

The methods and systems disclosed herein have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION

Figure 1:
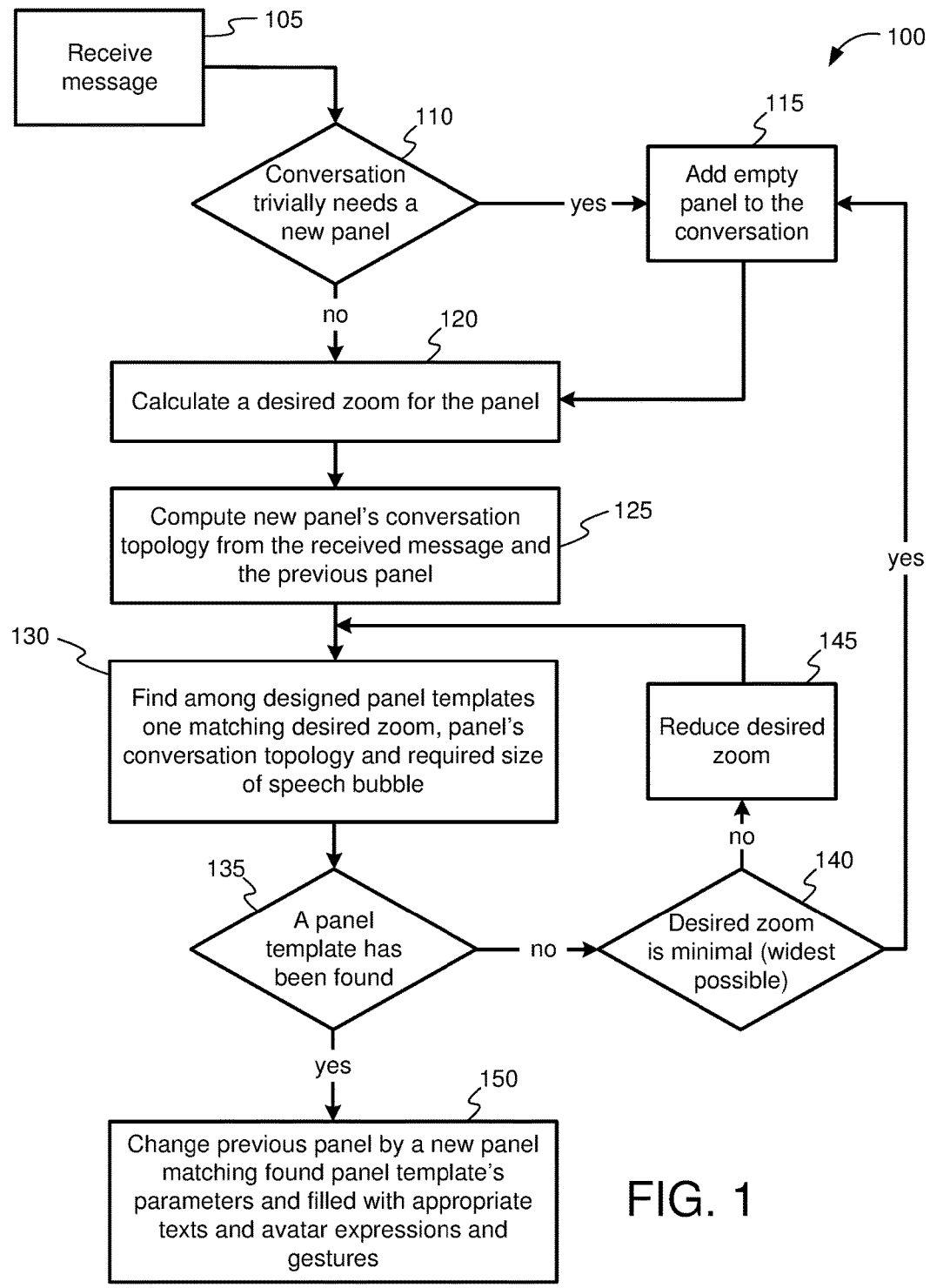
FIG. 1 is a flowchart of an exemplary method for messaging as a graphical comic strip in accordance with the present disclosure.

While this technology is susceptible of embodiment in many different forms, there is shown in the drawings and will herein be described in detail several specific embodiments with the understanding that the present disclosure is to be considered as an exemplification of the principles of the technology and is not intended to limit the technology to the embodiments illustrated.

The terminology used herein is for the purpose of describing particular embodiments only and is not intended to be limiting of the technology. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that like or analogous elements and/or components, referred to herein, may be identified throughout the drawings with like reference characters. It will be further understood that several of the figures are merely schematic representations of the present technology. As such, some of the components may have been distorted from their actual scale for pictorial clarity.

Embodiments of the present disclosure relate to systems and methods for messaging as a graphical comic strip. While current messaging applications allow for users to send text messages, pictures, emojis, stickers and videos to one another, they lack the ability to represent a conversation through a graphical and visual interpretation. The systems and methods automatically generate a visual representation of the conversation as a comic strip, a series of comic panels having a graphical environment, one or more user avatars associated with each user of the conversation, and a number of messages contained in associated speech bubbles.

In some embodiments, as users add text messages to the conversation, the systems and methods automatically generate an updated comic panel based on the new incoming message and the previous comic panel, or will generate a new comic panel if necessary—as will be described in greater detail below.

In various embodiments, users type and send text messages as they would with a conventional messaging application. The messages may come from another messaging system. The messaging system of the present disclosure receives the text message and automatically analyzes text of the message, a length of the text, any emoji selection and interpretation, time between the text message and a last received message, and a time of day. In general, the messaging system determines how to visually represent the text message in an ongoing conversation. Moreover, the comic strip and comic panels of the present disclosure could be sent to other messaging systems without any loss of information.

FIG. 1 illustrates an exemplary method 100 for messaging as a graphical comic strip of the present disclosure. In one embodiment, the method includes receiving a message of a conversation at a step 105. The received message includes at least one of a textual input and one or more emojis, as well as a timestamp. When the messaging system receives the message, the system extracts information such as an expression and a gesture for a user avatar associated with the user. The messaging system then sends the message and the extracted information to a client device of each user of the conversation, including the user who sent the message. The client device receives the message and the extracted information and independently processes the message and the extracted information to add it to the conversation.

In one or more embodiments, the conversation includes a previous comic panel, having a number of previous messages and a number of user avatars. If the conversation is new, the previous comic panel may be empty; in which case the number of previous messages and the number of user avatars is zero. Otherwise, the previous comic panel may contain any number of previous messages and any number of user avatars, to which the received message and the extracted information will be appended. If the user who sent the message is not yet represented by a user avatar in the conversation, the method will add an additional user avatar for the user.

The method also comprises a step 110 of determining whether the conversation requires a new comic panel. The conversation is represented as a comic strip comprising a plurality of comic panels to increase the readability of the conversation. In one or more embodiments, the method determines that the conversation requires a new comic panel in any of the following scenarios: there is no previous comic panel; there is a time delay between the message and the previous message of more than a predetermined amount of time; a maximum number of speech bubbles has been reached in the previous comic panel and the message requires a new speech bubble; a maximum number of user avatars has been reached in the previous comic panel and the message requires the addition of a new user avatar; the message would change an expression (but not a default expression) or a gesture (but not a default gesture) of an avatar in the previous comic panel; the message specifies a zoom level and the previous comic panel specifies a zoom level with a different value; or the user sets a new background. If the method determines that a new comic panel is required, then the method proceeds to step 115 in which an empty comic panel is added to the conversation.

If the method determines that a new comic panel is not required in step 110, or a new empty comic panel is added at step 115, the method proceeds to step 120 of automatically calculating a desired zoom level for the comic panel. To avoid monotony in the panel representation, the messaging system uses different zoom levels. In one or more embodiments, the zoom levels are discrete and represent a size scale of one or more elements contained within the comic panel, such as the user avatars and the background. One of ordinary skill in the art would appreciate that the zoom levels could also be on a continuous scale. The messaging system uses a list of all possible zooms with a statistic weight. In certain embodiments, closer zooms have more weight than wider zooms. In other embodiments, some zoom levels do not have a weight but are used later in the conversation. For a new panel, the messaging system uses a random weighted selection to select the zoom level used for a first message. For each additional message, the messaging system uses a probability table to update the zoom level. In one or more embodiments, the updated zoom level is only reduced (i.e., set as a wider zoom level).

The method then proceeds to step 125 to automatically compute a conversation topology from the received message and the previous comic panel. The conversation topology, or panel topology, represents the state of the conversation inside a comic panel at a given time. The conversation topology depends on the location and orientation of each user avatar, and the location and direction of one or more speech bubbles which are associated with each message, as shown and described in FIG. 2. Each speech bubble is also associated with a particular user, which is indicated with a speech tail directed at the associated user avatar.

At step 130, the method then searches for and selects a panel template based on the conversation topology, the zoom level, and a required size of each speech bubble. A plurality of panel templates are stored in memory, each having various values for a number of attributes, including but not limited to: a conversation topology, a zoom level, a camera height, a zoom type, a statistical weight, a number of speech bubbles, a number of emotes, and a number of user avatars. The panel templates also have attributes for each speech bubble, including but not limited to an order received, an absolute and a relative position, a minimum character length, a maximum character length, and a position, size and angle of a speech tail. Moreover, the panel templates have attributes for a position and orientation of each user avatar. Since the messaging system uses a large number of panel templates, the messaging system is flexible and can pick the best panel template for the conversation. For example, speech bubbles can be placed at any location within the panel.

The method then determines at step 135 whether a suitable panel template has been found. If the search for a panel template in step 130 does not result in a match, the method then determines at step 140 whether the desired zoom of the panel template is at a minimum level, or the widest zoom possible. If the method determines that the desired zoom level is not at a minimum, the method proceeds to step 145 and reduces the desired zoom level, then proceeding back to step 130. Otherwise, if the desired zoom level is determined to be at the minimum level at step 140, the method proceeds to step 115 to add an empty panel to the conversation and continues therefrom.

If the method determines at step 135 that a panel template has been found, at step 150 the method changes the previous comic panel for a new comic panel matching the panel template found at step 130, and fills the panel template with the appropriate messages, user avatars, expressions and gestures of the conversation.

In an example use case, a first message user can be represented by a first avatar and a second message user can be represented by a second avatar. The first user transmits a message to the second user that involves content about going on vacation to the beach. The text portion of the message is associated with a timestamp and can include emojis, as mentioned above. This information is then converted into a comic strip representation as described above.

In some embodiments, the avatars can be situated in an environment or background stage. By way of example, if the users are conversing in message form about going on a vacation to the beach, the background selected for the avatars could include a beach scene. The avatars can be clothed appropriately for the environment. In some embodiments the avatars can be clothed as specified by a user or can be clothed arbitrarily.

Figure 2:
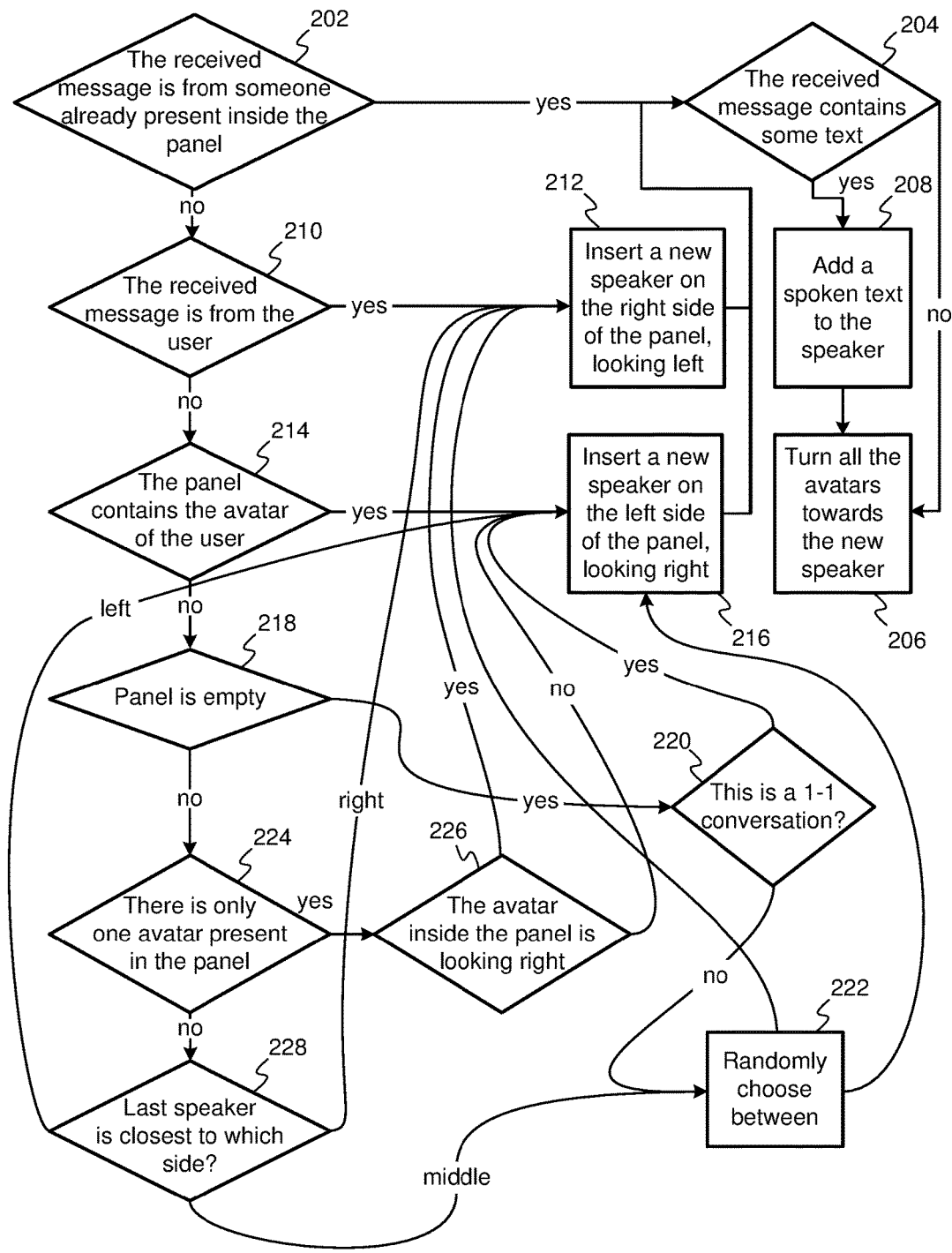
FIG. 2 is a flowchart of an exemplary method for computing a conversation topology in accordance with the present disclosure.

FIG. 2 is a flowchart of an exemplary method for computing a conversation topology in accordance with the present disclosure. The conversation topology requires the following parameters: the respective order of the user avatars; the respective orientation of each user avatar; whether the avatar represents the user of the client device; which user avatar represents the last user to send a message; the respective order of each message; and the respective sender of each message. FIG. 2 depicts the flowchart for determining the location and the orientation for each respective user avatar.

In step 202, a determination is made whether a message is received from a participant in a current conversation or if the message is from a new participant. If the message is from a current participant, the method continues to step 204 where textual content from the message is evaluated, if any is present. If no text is in the message, the method proceeds to step 206 where user avatars currently in the conversation are turned to face the speaking user avatar.

If the message from the user avatar comprises textual content, the method proceeds to step 208 where spoken text is added to the user avatar in the form of bubble text.

In step 210, it is assumed that the message is from a new participant in a current conversation. If this is the case, the method proceeds to step 212 where a new user avatar, representing the new participant or speaker, is inserted on a right side of a current comic panel and the new avatar is arranged to look leftward.

Step 214 indicates that if a comic panel already includes a user avatar for a user associated with a received message, the method can proceed to step 216 where a speaker (e.g., user avatar) can be inserted into the comic panel on the left side and faced to look rightward.

If the comic panel does not include an avatar associated with the received message and there are no avatars present in the comic panel as determined in step 218, the method can proceed to step 220 if there is a one-on-one conversation, and then to step 216 as described above. If the conversation is not one-on-one, the system can randomly choose either step 216 or step 212 for placement of a new avatar.

If the comic panel had at least one avatar as determined in step 218, the method proceeds to step 224 where if only one avatar is present in the comic panel the method includes placing a new avatar in the comic panel facing right in step 226. From step 226 the system can choose to place new avatars in the comic panel according to steps 212 or 216 as described above.

In step 228, the system determines to which side (left or right) the last speaker was closest. Based on this positioning, the system can select step 222 for random selection of location of the new avatar when the last speaker was in the middle of the comic panel, or alternatively, step 212 or 216 as described above if the last speaker was near the right or left of the comic panel, respectively.

Figure 3:
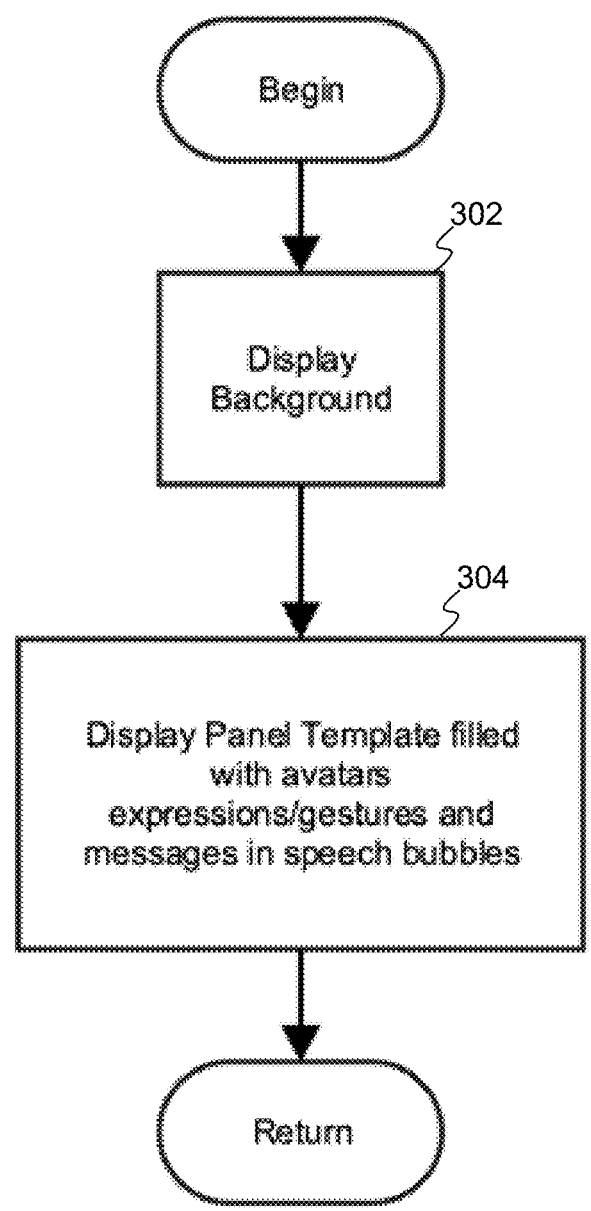
FIG. 3 is a block diagram of an exemplary method for displaying a comic panel in accordance with the present disclosure.

FIG. 3 is a block diagram of an exemplary method for displaying a comic panel in accordance with the present disclosure. To avoid monotony in the panel representation, the backgrounds used in the messaging system have a larger width than a width of each comic panel. Each time a comic panel is displayed, the background is first displayed with a variable horizontal position in step 302. Then, the selected panel template is overlaid with the user avatars having the appropriate expressions and gestures, and messages in associated speech bubbles, as needed by the conversation in step 304.

Figure 4:
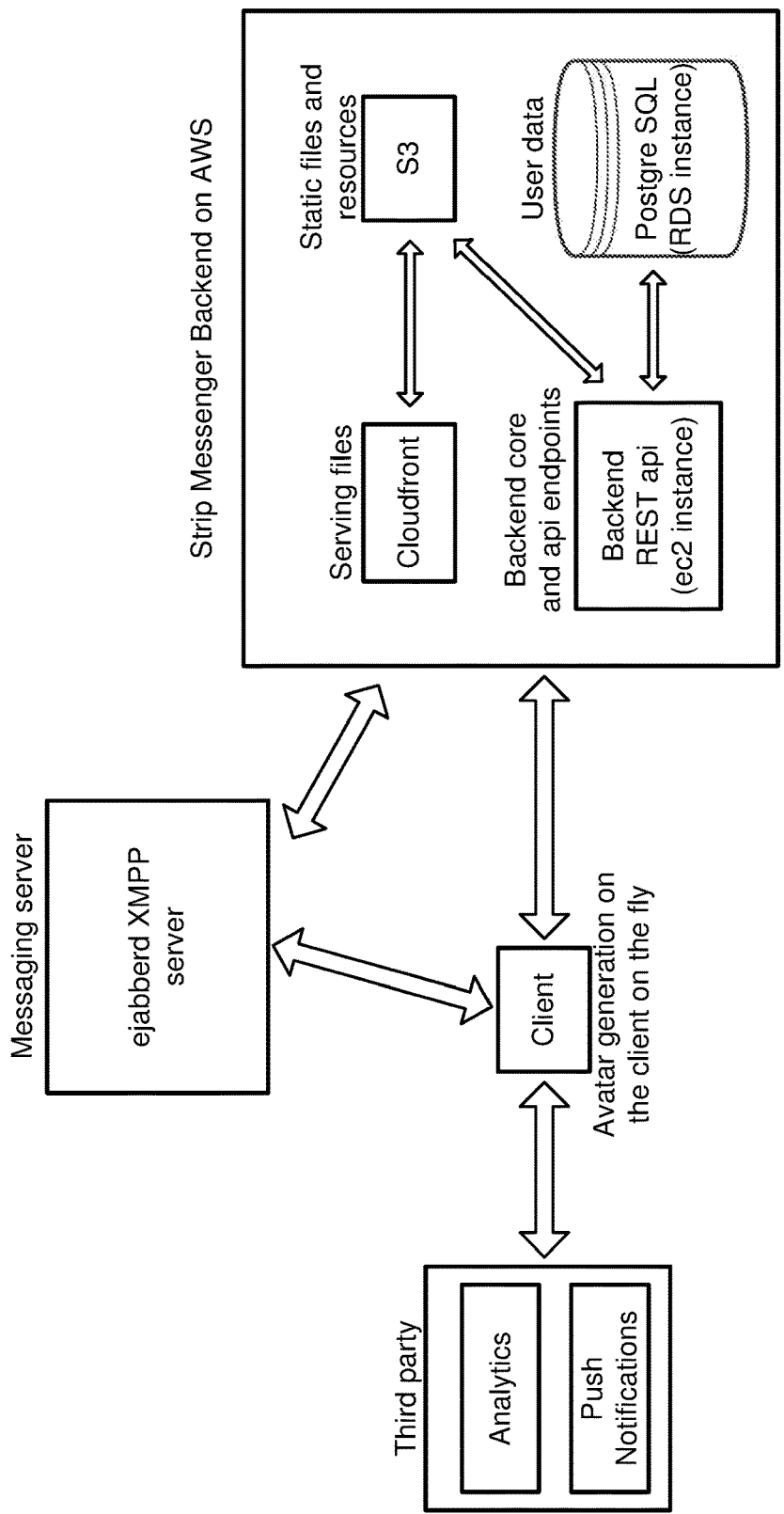
FIG. 4 is a diagrammatic representation of a network that may be used to implement embodiments according to the present technology.

FIG. 4 is a diagrammatic representation of a network that may be used to implement embodiments according to the present technology. The network includes one or more client devices, a messaging server, and a messaging backend web service. The messaging backend web service comprises serving files, static files and resources, a backend core and API endpoints, and user data stored in memory.

Figure 5:
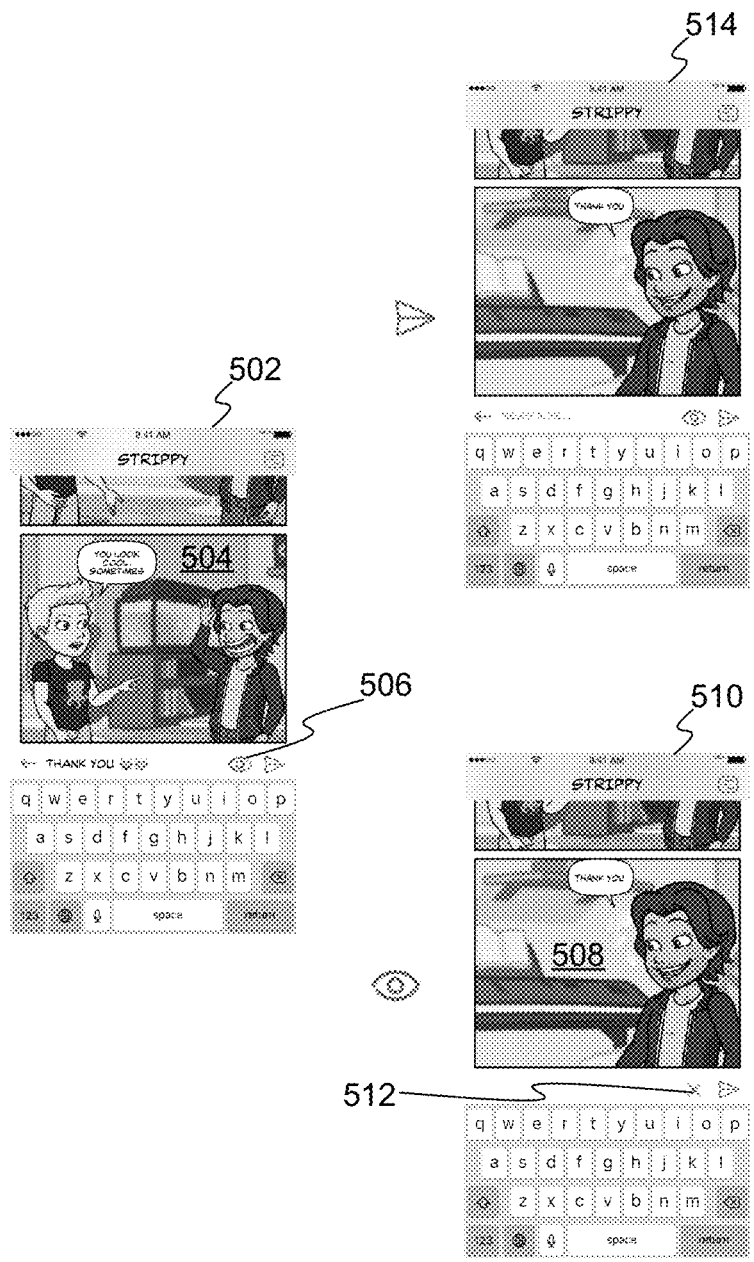
FIG. 5 illustrates various graphical user interfaces that comprise comic panels and illustrating the creation and use of a preview function.

FIG. 5 illustrates example graphical user interfaces that comprise comic panels of the present disclosure created from messages received from users. These graphical user interfaces (GUIs) allow for various optional functionalities such as message previewing, message send indications, and other control mechanisms. For example, in GUI 502, after typing in a text message into a messaging application, the user can preview the comic panel 504 using the view icon 506. As mentioned above, the user can input text and emojis. The emojis and text can be converted to gestures, expressions, or other visible changes to the avatars present in the comic panel. A preview comic panel 508 is illustrated in GUI 510. It will be noted that the preview comic panel 508 has a zoom level that highlights the user avatar associated with the message being displayed. If the user does not like the comic panel in the preview mode, the user can cancel the message and start over using the cancel icon 512.

The message as transmitted and illustrated to the recipient party is illustrated in GUI 514. Once the message is transmitted, the visual result is final and cannot be altered.

Figure 6:
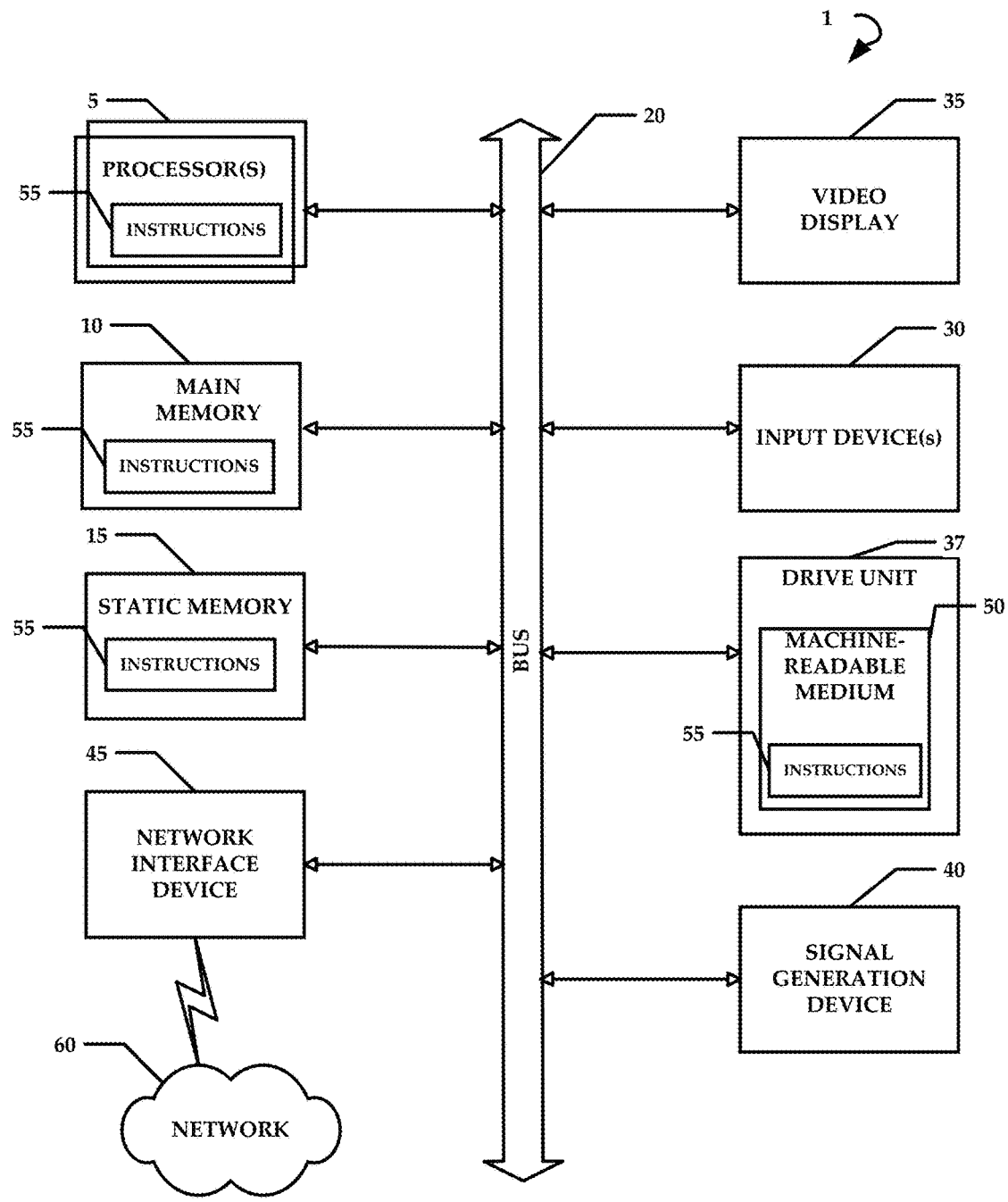
FIG. 6 illustrates an exemplary computing system that may be used to implement embodiments according to the present technology.

FIG. 6 is a diagrammatic representation of an example machine in the form of a computer system 1, within which a set of instructions for causing the machine to perform any one or more of the methodologies discussed herein may be executed. In various example embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a personal digital assistant (PDA), a cellular telephone, a portable music player (e.g., a portable hard drive audio device such as a Moving Picture Experts Group Audio Layer 3 (MP3) player), a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1 includes a processor or multiple processor(s) 5 (e.g., a central processing unit (CPU), a graphics processing unit (GPU), or both), and a main memory 10 and static memory 15, which communicate with each other via a bus 20. The computer system 1 may further include a video display 35 (e.g., a liquid crystal display (LCD)). The computer system 1 may also include an alpha-numeric input device(s) 30 (e.g., a keyboard), a cursor control device (e.g., a mouse), a voice recognition or biometric verification unit (not shown), a drive unit 37 (also referred to as disk drive unit), a signal generation device 40 (e.g., a speaker), and a network interface device 45. The computer system 1 may further include a data encryption module (not shown) to encrypt data.

The disk drive unit 37 includes a computer or machine-readable medium 50 on which is stored one or more sets of instructions and data structures (e.g., instructions 55) embodying or utilizing any one or more of the methodologies or functions described herein. The instructions 55 may also reside, completely or at least partially, within the main memory 10 and/or within the processor(s) 5 during execution thereof by the computer system 1. The main memory 10 and the processor(s) 5 may also constitute machine-readable media.

The instructions 55 may further be transmitted or received over a network (e.g., network 60) via the network interface device 45 utilizing any one of a number of well-known transfer protocols (e.g., Hyper Text Transfer Protocol (HTTP)). While the machine-readable medium 50 is shown in an example embodiment to be a single medium, the term "computer-readable medium" should be taken to include a single medium or multiple media (e.g., a centralized or distributed database and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media, and carrier wave signals. Such media may also include, without limitation, hard disks, floppy disks, flash memory cards, digital video disks, random access memory (RAM), read only memory (ROM), and the like. The example embodiments described herein may be implemented in an operating environment comprising software installed on a computer, in hardware, or in a combination of software and hardware.

One skilled in the art will recognize that the Internet service may be configured to provide Internet access to one or more computing devices that are coupled to the Internet service, and that the computing devices may include one or more processors, buses, memory devices, display devices, input/output devices, and the like. Furthermore, those skilled in the art may appreciate that the Internet service may be coupled to one or more databases, repositories, servers, and the like, which may be utilized in order to implement any of the embodiments of the disclosure as described herein.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the present disclosure in the form disclosed. Many modifications and variations will be apparent to those of ordinary skill in the art without departing from the scope and spirit of the present disclosure. Exemplary embodiments were chosen and described in order to best explain the principles of the present disclosure and its practical application, and to enable others of ordinary skill in the art to understand the present disclosure for various embodiments with various modifications as are suited to the particular use contemplated.

Aspects of the present disclosure are described above with reference to flowchart illustrations and/or block diagrams of methods, apparatus (systems) and computer program products according to embodiments of the present disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

While this technology is susceptible of embodiment in many different forms, there is shown in the drawings and will herein be described in detail several specific embodiments with the understanding that the present disclosure is to be considered as an exemplification of the principles of the technology and is not intended to limit the technology to the embodiments illustrated.

The terminology used herein is for the purpose of describing particular embodiments only and is not intended to be limiting of the technology. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that like or analogous elements and/or components, referred to herein, may be identified throughout the drawings with like reference characters. It will be further understood that several of the figures are merely schematic representations of the present disclosure. As such, some of the components may have been distorted from their actual scale for pictorial clarity.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In the following description, for purposes of explanation and not limitation, specific details are set forth, such as particular embodiments, procedures, techniques, etc. in order to provide a thorough understanding of the present invention. However, it will be apparent to one skilled in the art that the present invention may be practiced in other embodiments that depart from these specific details.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" or "according to one embodiment" (or other phrases having similar import) at various places throughout this specification are not necessarily all referring to the same embodiment. Furthermore, the particular features, structures, or characteristics may be combined in any suitable manner in one or more embodiments. Furthermore, depending on the context of discussion herein, a singular term may include its plural forms and a plural term may include its singular form. Similarly, a hyphenated term (e.g., "on-demand") may be occasionally interchangeably used with its non-hyphenated version (e.g., "on demand"), a capitalized entry (e.g., "Software") may be interchangeably used with its non-capitalized version (e.g., "software"), a plural term may be indicated with or without an apostrophe (e.g., PE's or PEs), and an italicized term (e.g., "$N+1$") may be interchangeably used with its non-italicized version (e.g., "$N+1$"). Such occasional interchangeable uses shall not be considered inconsistent with each other.

Also, some embodiments may be described in terms of "means for" performing a task or set of tasks. It will be understood that a "means for" may be expressed herein in terms of a structure, such as a processor, a memory, an I/O device such as a camera, or combinations thereof. Alternatively, the "means for" may include an algorithm that is descriptive of a function or method step, while in yet other embodiments the "means for" is expressed in terms of a mathematical formula, prose, or as a flow chart or signal diagram.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It is noted at the outset that the terms "coupled," "connected", "connecting," "electrically connected," etc., are used interchangeably herein to generally refer to the condition of being electrically/electronically connected. Similarly, a first entity is considered to be in "communication" with a second entity (or entities) when the first entity electrically sends and/or receives (whether through wireline or wireless means) information signals (whether containing data information or non-data/control information) to the second entity regardless of the type (analog or digital) of those signals. It is further noted that various figures (including component diagrams) shown and discussed herein are for illustrative purpose only, and are not drawn to scale.

While specific embodiments of, and examples for, the system are described above for illustrative purposes, various equivalent modifications are possible within the scope of the system, as those skilled in the relevant art will recognize. For example, while processes or steps are presented in a given order, alternative embodiments may perform routines having steps in a different order, and some processes or steps may be deleted, moved, added, subdivided, combined, and/or modified to provide alternative or sub-combinations. Each of these processes or steps may be implemented in a variety of different ways. Also, while processes or steps are at times shown as being performed in series, these processes or steps may instead be performed in parallel, or may be performed at different times.

While various embodiments have been described above, it should be understood that they have been presented by way of example only, and not limitation. The descriptions are not intended to limit the scope of the invention to the particular forms set forth herein. To the contrary, the present descriptions are intended to cover such alternatives, modifications, and equivalents as may be included within the spirit and scope of the invention as defined by the appended claims and otherwise appreciated by one of ordinary skill in the art. Thus, the breadth and scope of a preferred embodiment should not be limited by any of the above-described exemplary embodiments.

What is claimed is:

1. A method for messaging as a graphical comic strip, comprising:
   providing a comic panel having a number of previous messages and a number of user avatars;
   receiving a message from a user, the message comprising at least one of a textual input, an emoji, and a timestamp;
   computing a conversation topology for the comic panel based on the message, the number of previous messages, and the number of user avatars, wherein the conversation topology specifies that if a last speaker of the user avatars is located on a left side of the graphical comic strip, a new user avatar is placed on the left side of the comic panel, and if the last speaker of the user avatars is located on a right side of the graphical comic strip, a new user avatar is placed on the right side of the comic panel;
   selecting a panel template based on a zoom level, the conversation topology, and a length of each message; and
   filling the panel template with user avatars and each message in an associated speech bubble to create the comic panel.

2. The method according to claim 1, further comprising extracting an expression and a gesture from content of the message.

3. The method according to claim 1, further comprising calculating the zoom level for the comic panel, wherein the zoom level is discrete and represents a size scale of one or more elements in the comic panel.

4. The method according to claim 3, further comprising selectively adjusting the zoom level for a subsequent comic panel relative to the comic panel, wherein the selective adjusting occurs according to a probabilistic random weighting.

5. The method according to claim 1, wherein the computing the conversation topology further comprises causing the user avatars to turn and view one of the user avatars that is speaking.

6. The method according to claim 1, wherein the computing the conversation topology further comprises determining if the message is received from the new user avatar, wherein the new user avatar is placed on the right side of the comic panel and facing leftward.

7. The method according to claim 1, wherein the conversation topology specifies that if there is only one user avatar in the comic panel the user avatar is positioned so as to look rightward.

8. The method according to claim 1, wherein the conversation topology specifies that a random selection of positioning of the new user avatar can occur if there are only two avatars.

9. A method for messaging as a graphical comic strip, comprising:
   receiving a message from a user, the message comprising at least one of a textual input, an emoji, and a timestamp;
   determining that a new comic panel is required;
   generating avatars for participants identified in the message;
   providing the comic panel having the avatars;
   computing a conversation topology for the comic panel based on the message and a number of user avatars, wherein the conversation topology specifies that if a last speaker of the user avatars is located on a left side of the graphical comic strip, a new user avatar is placed on the left side of the comic panel, and if the last speaker of the user avatars is located on a right side of the graphical comic strip, a new user avatar is placed on the right side of the comic panel; and
   filling a panel template with the user avatars and each message in an associated speech bubble.

10. The method according to claim 9, wherein the determining that a new comic panel is required comprises detecting whether any of a new conversation and a time delay between the message and a prior message exceeds a threshold.

11. The method according to claim 9, wherein the determining that a new comic panel is required comprises detecting at least one of a maximum number of speech bubbles has been reached in prior comic panels and a maximum number of user avatars has been reached in a previous comic panel.

12. The method according to claim 9, wherein the determining that a new comic panel is required comprises determining that any of an expression or gesture of an avatar requires changing or a zoom level requires adjustment relative to a prior comic panel.

13. The method according to claim 9, further comprising selecting a background of the comic strip based on content in the message.

14. The method according to claim 9, further comprising providing a preview of the comic panel prior to transmitting the comic panel.

15. The method according to claim 9, wherein the conversation topology selects a placement and viewpoint of a new avatar when the message is received from a new one of the participants, wherein the placement and viewpoint are based on a location of the avatar that last spoke.

16. The method of claim 9, further comprising selecting the panel template based on at least one of a zoom level, the conversation topology, and a length of each message.

17. The method of claim 9, further comprising calculating a zoom level for the new comic panel, wherein the zoom level is discrete and represents a size scale of one or more elements in the new comic panel.

18. The method of claim 9, wherein the conversation topology specifies that if there are only two avatars, the two avatars can be positioned randomly.

19. The method of claim 1, further comprising determining that a new comic panel is required.

20. The method of claim 1, further comprising selecting a background of the comic panel based on content in the message.

* * * * *